United States Patent [19]

Strabala

[11] Patent Number: 5,534,058
[45] Date of Patent: Jul. 9, 1996

[54] STRUCTURAL PRODUCTS MANUFACTURED FROM FLY ASH

[75] Inventor: William M. Strabala, Arvada, Colo.

[73] Assignee: Midway Environmental Associates, Inc., Arvada, Colo.

[21] Appl. No.: 379,949

[22] Filed: Jan. 27, 1995

[51] Int. Cl.$^6$ ............................ C04B 12/00; C04B 14/04
[52] U.S. Cl. ........................ 106/708; 106/705; 106/712; 106/697; 106/802; 106/805; 106/819; 106/823; 106/DIG. 1
[58] Field of Search ...................... 106/705, 708, 106/712, 802, 803, 819, 823, 792, 795, 731, DIG. 1, 697; 264/299, 319, DIG. 43, DIG. 49

[56] References Cited

U.S. PATENT DOCUMENTS

| | | | |
|---|---|---|---|
| 1,608,562 | 11/1926 | Melandri | 106/731 |
| 3,625,723 | 12/1971 | Sicka | 106/86 |
| 3,753,749 | 8/1973 | Nutt | 106/731 |
| 4,132,555 | 1/1979 | Barrable | 106/805 |
| 4,659,385 | 4/1987 | Costopoulos et al. | 106/87 |
| 4,840,672 | 6/1989 | Baes | 106/731 |
| 4,985,119 | 1/1991 | Vinson et al. | 106/731 |
| 5,048,250 | 9/1991 | Elias | 106/731 |
| 5,102,596 | 4/1992 | Lempfer et al. | 106/731 |
| 5,154,771 | 10/1992 | Wada et al. | 106/730 |
| 5,350,451 | 9/1994 | Patterson | 106/805 |
| 5,366,548 | 11/1994 | Riddle | 106/705 |
| 5,405,211 | 4/1995 | Halwani | 106/805 |

OTHER PUBLICATIONS

"Utilization of Coal Combustion By–Products for Masonry Construction," Electric Power Research Institute, EPRI TR–100707s (Date unknown).
Kosmatka et al. "Design & Control of Concrete Mixtures", PCA, Thirtheenth edition 1988 p. 64 (no month).

*Primary Examiner*—Mark L. Bell
*Assistant Examiner*—Michael Maicheschi
*Attorney, Agent, or Firm*—Sheridan Ross & McIntosh

[57] ABSTRACT

A structural product fabricated from waste materials and a method for making the product. The product includes fly ash, cellulose-based material and an adhesive binder. The product advantageously has good strength with light weight, can be sawed or hammered like wood and is substantially resistant to fire. The composition is particularly useful for forming structural products such as bricks, panels, roof shingles, studs and the like.

16 Claims, No Drawings

STRUCTURAL PRODUCTS MANUFACTURED FROM FLY ASH

FIELD OF THE INVENTION

The present invention relates to structural products, such as building materials, manufactured using predominately recycled waste materials. More particularly, the present invention relates to structural products having good strength and toughness that are fabricated using fly ash and cellulose-based material, such as wood sawdust or waste paper pulp.

BACKGROUND OF THE INVENTION

Environmental regulations and general public awareness of the problems relating to the disposal of waste materials has led to attempts to use recycled waste material in a variety of applications.

One such waste material is fly ash. Fly ash refers to the fine particulate matter that is carried upward by hot gasses from the combustion of coal in energy-generating facilities. Fly ash is produced by such facilities in large quantities and most of the fly ash is captured and buried in landfills. There have been a number of attempts in the prior art to use fly ash in a variety of structural products.

U.S. Pat. No. 5,154,771 by Wada et al. discloses an inorganic composition which optionally includes Portland cement as a component, and it is disclosed that the Portland cement can include some fly ash. The composition further includes a polysaccharide, a molding aid, an optional reinforcing fiber and water.

U.S. Pat. No. 3,625,723 by Sicka discloses a method for making a cellular foam product that includes fly ash as the main ingredient. The fly ash is mixed with an aluminum phosphate solution, calcium silicate, aluminum hydroxide and a carbonate to prepare a foam which is dried to produce a structural product having a density of about 45 lb/ft$^3$.

U.S. Pat. No. 5,366,548 by Riddle discloses a composition that includes fly ash which is useful for forming construction blocks. The grade of fly ash used in the invention is that which possesses pozzolanic (cement-like) behavior, such as Class C fly ash. The fly ash is mixed with kiln dust and water and high pressure is applied to form a brick.

U.S. Pat. No. 4,659,385 by Costopoulos et al. discloses a building material manufactured from fly ash, specifically, a light-weight cementitious building material. The composition includes fly ash, a bonding agent, an air entrainer and a foaming agent. It is disclosed that the structural product has the appearance of concrete and can be used like concrete and that the method for making the material is much like ordinary concrete.

Despite the foregoing, it would be useful to formulate a structural product predominately using waste materials, such as fly ash, wherein the structural product has good density and is useful as a building material. It would be advantageous if such a product was capable of receiving nails and screws without significant chipping or cracking and without predrilling pilot holes. It would be useful if the material was relatively light weight, yet strong enough to use as structural bricks. It would be useful if the product in the form of blocks could be attached seamlessly and was substantially fire resistant. It would be useful if such material could be easily milled into a variety of shapes using ordinary hand tools. It would be beneficial if the material substantially eliminated or reduced the need for and cost of wooden studs, insulation, mortar, exterior siding, combustible roofing or gypsum wall board. It would also be beneficial if the product could be made using an efficient and relatively inexpensive process.

SUMMARY OF THE INVENTION

The various embodiments of the present invention address the foregoing objects. The present invention provides an article of manufacture, preferably a structural building product, that includes fly ash, a cellulose-based material such as wood saw dust or waste paper pulp, and an adhesive binder.

The structural building products according to the present invention offer numerous advantages. The material used to form the product can be drilled, nailed, screwed, sanded and the like using ordinary hand tools. The material is substantially fire resistant and provides good thermal insulation. Bricks of the material can be glued together using standard construction adhesive to form a seamless wall. The material can be easily painted or coated for aesthetic or functional purposes. The material is about 40 percent lighter than traditional clay brick, yet provides good strength and resists chipping or cracking.

In addition to the foregoing, the primary components of the material are waste materials that are now landfilled or otherwise disposed. Reclamation of these materials lessens the load on such landfills and enables products to be produced at low cost due to the availability and low cost of the raw materials.

According to one aspect of the present invention, an article of manufacture is provided that includes from about 70 to about 85 weight percent fly ash, from about 15 to about 30 weight percent cellulose-based material and an adhesive binder, preferably up to about 1 weight percent of an adhesive binder. The article preferably has a density of at least about 60 lb/ft$^3$.

According to a preferred embodiment of this aspect of the invention, the article has a density of from about 70 lb/ft$^3$ to about 85 lb/ft$^3$. According to another preferred embodiment the article includes from about 71 to about 82 weight percent fly ash and from about 18 to about 29 weight percent cellulose-based material. The cellulose-based material can advantageously be selected from the group consisting of wood sawdust and waste paper pulp. The article can further include up to about 35 weight percent of an inert filler based on the total weight of the fly ash, the cellulose-based material, the adhesive binder and the inert filler. The inert filler can advantageously be selected from the group consisting of waste lime, Class F fly ash, bottom ash and mixtures thereof. In a preferred embodiment the fly ash consists essentially of Class C fly ash. In another preferred embodiment the adhesive binder is a polyvinyl acetate binder. In addition to the foregoing, the article can also include a dye to impart a desired color to the article.

According to another aspect of the present invention, a structural product is provided consisting essentially of from about 70 to about 85 weight percent fly ash, from about 15 to about 30 weight percent cellulose-based material, and less than about 1 weight percent of an adhesive binder, the foregoing based upon the total weight of fly ash, cellulose-based material and binder. The product also includes up to about 35 weight percent of an inert filler based upon the total weight of the fly ash, cellulose-based material, binder and inert filler and the product has a density of at least about 60 lb/ft$^3$.

According to another aspect of the present invention, a method for making an article of manufacture is provided.

The method includes the steps of forming a powder composition comprising from about 70 to about 85 weight percent fly ash and from about 15 to about 30 weight percent cellulose-based material, forming an aqueous emulsion comprising up to about 1 weight percent of an adhesive binder based upon the total weight of the fly ash, cellulose-based material and binder, mixing the powder composition and the aqueous emulsion to form a slurry, delivering the slurry to a mold, drying the slurry in the mold to form a molded article and removing the article from the mold.

According to preferred embodiments of this aspect of the present invention, the step of drying the slurry includes the step of compressing the slurry in the mold. The powder composition can include from about 71 to about 82 weight percent fly ash and from about 18 to about 29 weight percent cellulose-based material. The article can further include up to about 35 weight percent of an inert filler material selected from the group consisting of lime, bottom ash and Class F fly ash based upon the total weight of the fly ash, the cellulose-based material, the binder and the inert filler material. The method can further include the step of curing the article in steam.

DESCRIPTION OF PREFERRED EMBODIMENTS

The present invention is directed to an article of manufacture that is predominately fabricated using waste materials. Preferably, the article of manufacture is a structural building product, such as a brick, roof shingle, stud or panel. More preferably, the structural product is a brick of the type used to construct walls for residential or commercial buildings.

The article of manufacture according to the present invention includes at least three components. These components are fly ash, cellulose-based material and an adhesive binder. As used herein, the term "fly ash" refers generally to the finely divided ash residue produced by the combustion of pulverized coal, which is carried off with the gasses exhausted from the furnace in which the coal is burned. Fly ash is collected by means such as a suitable precipitation and/or filtration apparatus in the smokestack.

According to the present invention, it is preferable to use Class C fly ash. Class C fly ash is a low-carbon form of fly ash that the byproduct of the combustion of lignite type coal and is cementitious in nature. Class C fly ash can be distinguished from Class F fly ash, which is a byproduct of burning coal having a higher carbon content and therefore Class F fly ash has higher carbon content. Although it is preferred that the fly ash used in the present invention contain predominantly Class C fly ash, some Class F fly ash can be present without substantially affecting the properties of articles produced according to the present invention. Even so, it is most preferred that the fly-ash used consist essentially of about 100 weight percent Class C fly ash.

The article according to the present invention also includes cellulose-based material. As used herein, the term cellulose-based material refers to vegetable tissues, such as wood, grass, cotton and the like. The cellulose-based material should be in the form of small fibers or particulates. Preferably, the cellulose-based material is recycled from waste products, such as wood sawdust or paper pulp, for example, or pulverized cardboard.

Other types of cellulose-based material can also be used.

The article according to the present invention also includes an adhesive binder. The adhesive binder is preferably an organic resin-based binder that reinforces the strength of the semi-cementitious composition and introduces chemical cross-linking to strengthen the composition. The adhesive binder is more preferably polyvinyl acetate, which can be introduced into the composition as a polyvinyl acetate emulsion. A specific example of a polyvinyl acetate emulsion that is useful according to the present invention is a composition sold under the trade name Duracet 7005, available from Franklin International, Columbus, Ohio. However, it is also believed that certain non-resinous binders may be useful in the present invention.

According to the present invention, the article includes at least about 70 weight percent fly ash. As used herein, the preferred weight percentages of fly ash are expressed in relation to the total weight of fly ash, cellulose-based material and binder. Preferably, the composition includes at least about 70 weight percent fly ash and more preferably at least about 71 weight percent fly ash. A minimum amount of fly ash in the composition is desirable to increase the material's basic hardness, strength and fire resistance.

Further, the composition should include a maximum of about 85 weight percent fly ash. Preferably, the composition includes less than about 82 weight percent fly ash. Exceeding the maximum levels of fly-ash can produce an article that has reduced toughness and workability.

The composition also includes cellulose-based material. Preferably, the cellulose-based material comprises a minimum of about 15 weight percent of the composition. As used herein, the preferred weight percentages of cellulose-based material are expressed in relation to the total weight of the fly ash, cellulose-based material and binder. More preferably, the composition includes at least about 18 weight percent cellulose-based material. The amount of cellulose-based material should preferably not exceed about 30 weight percent and is more preferably less than about 29 weight percent of the composition.

The article according to the present invention also includes an adhesive binder. When the material is cured and dry, the adhesive binder preferably comprises about 1 weight percent or less of the composition. As used herein, the preferred weight percentages of adhesive binder are expressed in relation to the total weight of the fly ash, cellulose-based material and binder. For example, as an aqueous liquid emulsion, the binder can be added to the foregoing dry materials at a ratio of about 5 liquid ounces of binder emulsion to 1 pound of dry material to yield about 1 weight percent binder after drying and curing.

In addition to the foregoing, the article can also include other additives if desired. For example, the article can include substantially inert filler material, such as either lime ($CaCO_3$), Class F fly ash, or bottom ash, in an amount of up to about 35 weight percent based on the total weight of the fly ash, cellulose-based material, binder and inert filler. Waste lime is preferred and can be obtained from sugar refinery plants since lime is produced as a byproduct of the sugar refining process. In addition, the article can include a dye to impart to desired color to the article. Preferably, the dye is added to the composition in an amount of less than about 1 weight percent.

The article of manufacture has a good density and good strength. Depending on the desired structural performance, the density of the article can range from about 60 lb/ft$^3$ up to about 85 lb/ft$^3$, and preferably the article has a density of from about 70 lb/ft$^3$ to about 85 lb/ft$^3$.

In addition, the article advantageously combines the desirable properties of wood and cement. The material has good toughness and can be nailed and sawed similar to a wood product without substantial chipping or cracking. The material is also substantially fireproof. The material can be easily joined on flat planer surfaces using a simple bonding agent, such as standard construction grade adhesive and also has good adhesion with stucco and plaster compounds. Further, the composition does not swell or soften when exposed to water nor does it crack substantially when subjected to a freeze/thaw cycle.

To form a brick according to the present invention, the fly ash, cellulose-based material and inert filler, if used, are mixed in the proper weight percentages as discussed above to obtain a substantially homogenous mixture.

The adhesive binder is commonly provided in the form of an emulsion. The emulsion is preferably mixed with water to form a liquid having a water to binder ratio of from about 7:1 to about 14:1. The binder/water mixture and the dry ingredients are then mixed together to form a substantially homogeneous slurry. To formbricks, the slurry is poured into a mold having a desired shape to dry. The slurry preferably sets in the mold for a time period of at least about 15 minutes to form a solid molded article, which can be removed from the mold. The molded article can then optionally be placed in a high humidity chamber that is heated, for example at temperatures up to about 150° F.

Optionally, the composition can be pressure molded by applying pressure to the mold to accelerate the molding process. Compressing the article in the mold has also been found to enhance the strength of the final product. The article can also be injection molded. In addition, the molded article can optionally be cured in steam (water vapor) at a temperature of up to 150° F. for a period of time, such as up to about 28 days, to maximize the strength and hardness of the article.

After curing, the structural product can also be treated, such as by coating with a sealant such as urethane or coating with a paint or other material to enhance the aesthetic nature of the product.

In addition to the foregoing, other types of structural products can be produced using the composition of the present invention. For example, the slurry discussed above can be applied to a wooden or polystyrene sheet and dried as above to form a composite panel.

EXAMPLES

A series of samples were prepared to illustrate the effect of binder content and compression during the molding step on the properties of structural bricks according to the present invention.

5 samples were prepared, as illustrated in Table I. The samples included about 18 weight percent sawdust and about 82 weight percent C-class fly ash, based on the total weight of fly ash and saw dust. In addition, the samples included about 34 weight percent waste lime, for a total composition of 54 weight percent fly ash, 12 weight percent saw dust and 34 weight percent lime. The dry powders were mixed to obtain homogeneity.

An adhesive binder was mixed with water to obtain a flowable adhesive binder emulsion. The adhesive binder was a polyvinyl acetate resin sold under the tradename DURACET 7005 by Franklin International of Columbus, Ohio. The adhesive binder emulsion was mixed with water in ratios of 14:1 and 7:1, as is described in Table I.

The dry materials and binder emulsion were mixed to obtain a homogenous slurry. The slurry was poured into a mold having standard brick dimensions 8"×4"×2". The slurry was left in the mold for about 15 to 30 minutes before removal. The molded articles were then oven heated at a temperature of about 125° F. to 150° F. However, oven drying is not a preferred method of curing but is used to accelerate drying of the articles. As Table I illustrates, Samples 1, 2 and 3 were placed in the mold at ambient pressure while Samples 4 and 5 were placed in the mold and subjected to compression sufficient to reduce the slurry volume by about 20 percent. The load-bearing strength of the articles was measured by the application of uniform pressure in a press until failure (compression loading).

TABLE I

| Example | Binder Amount | Mold Pressure | Strength |
| --- | --- | --- | --- |
| 1 | None | Ambient | 260 psi |
| 2 | 14:1 | Ambient | 810 psi |
| 3 | 7:1 | Ambient | 525 psi |
| 4 | None | Moderate | 875 psi |
| 5 | 7:1 | Moderate | 1290 psi |

As Table I illustrates, it has been found that the amount of adhesive binder can substantially affect the compressive load strength of articles produced according to the invention. In addition, Table I illustrates that the application of a moderate amount of pressure during molding can advantageously increase the strength of the finished product.

In another example, the foregoing slurry composition was prepared and was applied to a polystyrene sheet to form a stressed skin panel. The slurry was dried in an oven at about 150° F. The resulting panel showed a load bearing strength of about 1890 pounds across a 4"×5" cross-section with the load being applied against a 6" height.

While various embodiments of the present invention have been described in detail, it is apparent that modifications and adaptations of those embodiments will occur to those skilled in the art. However, it is to be expressly understood that such modifications and adaptations are within the spirit and scope of the present invention.

What is claimed is:

1. An article of manufacture, comprising a substantially homogenous blend of:

(a) from about 70 to about 85 weight percent Class C fly ash or a mixture of Class c fly ash and Class F fly ash;

(b) from about 15 to about 30 weight percent cellulose-based material;

(c) an adhesive binder; and (d) up to about 35 weight percent of an inert filler based on the total weight of said fly ash, said cellulose-based material, said adhesive binder and said inert filler;

wherein said article has a density of at least about 60 lb/ft$^3$.

2. An article as recited in claim 1, wherein said article has a density of from about 70 lb/ft$^3$ to about 85 lb/ft$^3$.

3. An article as recited in claim 1, wherein said article comprises:

(a) from about 71 to about 82 weight percent fly ash; and (b) from about 18 to about 29 weight percent cellulose-based material.

4. An article as recited in claim 1, wherein said article comprises about 1 weight percent or less of an adhesive binder.

5. An article as recited in claim 1, wherein said cellulose-based material is selected from the group consisting of wood sawdust and paper pulp.

6. An article as recited in claim 1, wherein said inert filler is selected from the group consisting of waste lime, Class F fly ash, bottom ash and mixtures thereof.

7. An article as recited in claim 1, wherein said fly ash consists essentially of Class C fly ash.

8. An article as recited in claim 1, wherein said adhesive binder comprises polyvinyl acetate.

9. An article as recited in claim 1, wherein said article further comprises a dye to impart a color to said article.

10. An article as recited in claim 1, wherein said article is a structural product which comprises bricks, panels, roof shingles, or studs.

11. A structural product, consisting essentially of:
 (a) from about 70 to about 85 weight percent Class C fly ash or a mixture of Class C fly ash and Class F fly ash, from about 15 to about 30 weight percent cellulose-based material, and less than about 1 weight percent of an adhesive binder, the foregoing based upon the total weight of said fly ash, said cellulose-based material and said binder; and
 (b) up to about 35 weight percent of an inert filler based upon the total weight of said fly ash, said cellulose-based material, said binder and said inert filler;

wherein said product has a density of at least about 60 lb/ft$^3$.

12. A structural product as recited in claim 11, wherein said fly ash consists essentially of Class C fly ash.

13. A structural product as recited in claim 11, wherein said cellulose based material is selected from the group consisting of wood sawdust and paper pulp.

14. A structural product as recited in claim 11, wherein said adhesive binder comprises a polyvinyl acetate.

15. A structural product as recited in claim 11, wherein said inert filler is selected from the group consisting of waste lime, Class F fly ash, bottom ash and mixtures thereof.

16. A structural product as recited in claim 11, wherein said inert filler material consists essentially of waste lime.

\* \* \* \* \*